(12) United States Patent
Berlin et al.

(10) Patent No.: US 6,821,373 B1
(45) Date of Patent: Nov. 23, 2004

(54) METHOD OF PRODUCING A LAMINATED PACKAGING MATERIAL

(75) Inventors: Mikael Berlin, Lund (SE); Mats Bentmar, Svedala (SE); Katarina Flemmer-Karlsson, Lund (SE); Lars Bertilsson, Stuttgart (DE)

(73) Assignee: Tetra Laval Holdings & Finance S.A., Pully (CH)

( * ) Notice: Subject to any disclaimer, the term of this patent is extended or adjusted under 35 U.S.C. 154(b) by 99 days.

(21) Appl. No.: 10/070,363

(22) PCT Filed: Sep. 6, 2000

(86) PCT No.: PCT/SE00/01715

§ 371 (c)(1),
(2), (4) Date: Mar. 5, 2002

(87) PCT Pub. No.: WO01/17771

PCT Pub. Date: Mar. 15, 2001

(30) Foreign Application Priority Data

Sep. 7, 1999 (SE) .................................. 9903175

(51) Int. Cl.[7] .......................... B32B 31/12; B65D 65/40
(52) U.S. Cl. ................... 156/244.11; 428/511
(58) Field of Search .................... 428/511; 156/244.11, 156/244.27

(56) References Cited

U.S. PATENT DOCUMENTS

| | | | |
|---|---|---|---|
| 3,499,820 A | * | 3/1970 | Desaulniers ................ 428/323 |
| 4,460,425 A | | 7/1984 | Rausér et al. |
| 4,994,310 A | | 2/1991 | Frisk et al. |
| 5,057,359 A | * | 10/1991 | Merdem et al. ............ 428/213 |
| 5,133,999 A | | 7/1992 | Löfgren et al. |
| 5,248,534 A | | 9/1993 | Rosen |
| 5,330,845 A | | 7/1994 | Andersson et al. |
| 5,413,845 A | | 5/1995 | Löfgren et al. |
| 5,506,011 A | * | 4/1996 | Farrell et al. ............... 428/34.2 |
| 5,766,751 A | | 6/1998 | Kotani et al. |
| 5,849,128 A | * | 12/1998 | Kobinata et al. ........ 156/244.11 |
| 6,071,626 A | * | 6/2000 | Frisk .......................... 428/518 |
| 6,569,539 B2 | | 5/2003 | Bentmar et al. |
| 6,692,801 B1 | | 2/2004 | Berlin et al. |

FOREIGN PATENT DOCUMENTS

| | | |
|---|---|---|
| EP | 0 590 263 | 4/1994 |
| FR | 2 684 922 | 6/1993 |
| SE | 440519 | 8/1985 |
| WO | WO 97/13639 | 4/1997 |
| WO | WO 97/16312 | 5/1997 |
| WO | WO 97/22536 | 6/1997 |
| WO | WO 98/09812 | 3/1998 |
| WO | WO 99/01504 | 1/1999 |

OTHER PUBLICATIONS

Factors affecting Adhesion in polyethylene extrusion coating, Paperchem2, Vainio et al., vol. 50, No. 4a, p. 163–5, 168–170; N 4, 243–53, 255–56; Apr. 1968.*

* cited by examiner

Primary Examiner—Blaine Copenheaver
Assistant Examiner—Barbara J. Musser
(74) Attorney, Agent, or Firm—Burns, Doane, Swecker & Mathis, L.L.P.

(57) ABSTRACT

The invention relates to a method of producing a laminated packaging material (10) including a core layer (16) of paper or paperboard and a barrier layer (14) applied on one side of the core layer. The invention also relates to a laminated packaging material (10) produced according to the method, as well as a packaging container (50) which is produced from the laminated packaging material (10).

25 Claims, 5 Drawing Sheets

(10a)

(10b)

(10c)

(10d)

US 6,821,373 B1

METHOD OF PRODUCING A LAMINATED PACKAGING MATERIAL

FIELD OF THE INVENTION

The present invention relates to a method of producing a laminated packaging material comprising a core layer of paper or paperboard and a barrier layer applied on one side of the core layer.

The present invention also relates to a laminated packaging material produced according to the method, as well as to packaging containers which are produced from the laminated packaging material. Particularly advantageous packaging laminates in which polyvinyl alcohol or starch in combination with nanoparticles is used as a barrier layer material are provided.

BACKGROUND OF THE INVENTION

It is well-known in the packaging industry to employ laminated packaging material of a single-use nature for packing and transporting liquid foods. Normally, such laminated packaging materials are built up from a configurationally rigid but foldable core layer consisting of, for example, paper or paperboard in order to achieve good mechanical configurational stability. Liquid-tight coatings of plastic are applied on both sides of the core layer and effectively protect the core layer of liquid-absorbing fibre from penetration by moisture. These outer layers normally consist of a thermoplastic, preferably polyethylene, which moreover impart to the packaging material superior thermosealing properties, whereby the packaging material may be converted into finished packages with the desired geometric configuration.

However, laminated packaging material consisting solely of paper or paperboard and liquid-tight plastic lacks tightness properties vis-a-vis gases, in particular oxygen gas. This is a major drawback in the packing of many foods whose shelf-life deteriorates dramatically when in contact with oxygen gas, such as for example fruitjuices. In order to supplement the packaging material with a barrier against gases, especially oxygen gas, it is known in the art to apply a layer possessing superior oxygen gas tightness properties, for example aluminum foil or polyvinyl alcohol, on that side of the core layer which is intended to face in towards the inside of the package.

In comparison with aluminum foil, polyvinyl alcohol enjoys many desirable properties, with the result that it is preferred as barrier material in many contexts. Among these, mention might be made of the polyvinyl alcohol's superior strength properties, compatibility with foods and economic value, together with its excellent oxygen gas barrier properties. Moreover, it has been considered to be expedient, in certain cases from the point of view the environment and recycling, to replace aluminum foil as the gas barrier material in food packages.

Like many other conceivable barrier or adhesive polymers such as, for example, ethylene vinyl alcohol, starch, starch derivate, carboxy methyl cellulose and other cellulose derivates or mixtures thereof, polyvinyl alcohol is suitably applied by means of a coating process, i.e. in the form of a dispersion or aqueous solution which, On application, is spread out to a thin, uniform layer on the substrate and thereafter dried. We have found that one drawback in this process however is that an aqueous polymer dispersion or polymer solution of, for example, polyvinyl alcohol with an addition of EAA which is applied on a core layer of paper or paperboard penetrates into the liquid-absorbing fibres of the core layer. In connection with the removal of water for drying and possibly for curing the applied barrier layer, the core layer is also subjected to elevated temperatures for drying, and as a result the risk of undesirable crack formation in the paperboard or paper layer, respectively, increases as a result of the moisture content which is difficult to adjust, and the drying which takes place in this layer.

Swedish Patent No. 440519 proposed including a thickening agent such as alginate to reduce penetration of water into the board. The use of PVOH as a barrier material applied over a polymer layer preventing crack formation and smoothing the board surface was disclosed in WO97/13639.

One drawback is that the polyvinyl alcohol is moisture sensitive and rapidly loses its barrier properties when it is exposed to a damp environment. This inconvenience was previously obviated according to WO97/22536 by combining the polyvinyl alcohol with one or more per se known food-approved polymers, for example ethylene acrylic acid Copolymer (EAA) or styrene butadiene copolymer. These advantageously form, in combination with polyvinyl alcohol, a coherent, well integrated layer possessing superior gas barrier properties, in particular oxygen gas barrier properties, at the same time as the desired superior gas barrier properties of the polyvinyl alcohol are retained even in a damp environment.

WO97/22536 disclosed that polyvinyl alcohol mixed with EAA-ethylene copolymer or the like material could be dispersion coated onto a paperboard previously coated with a polymer and thereafter could be dried and cured at temperatures of up to 170° C. to form a laminated packaging material with a very good barrier property.

Without being restricted to any particular theory, it is suggested that the improved oxygen and water barrier properties results from an esterification reaction between the PVOH and the EAA all the increased curing temperature, whereby the PVOH is crosslinked by hydrophobic EAA polymer chains, which thereby are built into the structure of the PVOH.

Another drawback in the employment of, for example, polyvinyl alcohol as barrier layer instead of aluminum foil is that, on storage of lightsensitive foods, it is necessary in many cases also to incorporate into the packaging material a light barrier of some type. Granted, a core layer of paper or paperboard does not (to the naked eye) allow the passage of any light, but light in invisible wavelength ranges nevertheless penetrates through from the outside of a packaging container to the packed food product and may have a negative effect on it from the point of view of shelflife. The employment of aluminum foil in the packaging material enjoys that advantage that the aluminum foil in itself constitutes a good barrier against both gases and against light. On the other hand, polyvinyl alcohol is as good as completely transparent even in mixtures with a hydrophobic polymer such as ethylene acrylic acid copolymer or styrene butadiene copolymer. The admixture of conventional light barriers, such as carbon black and titanium dioxide into any of the plastic layers included in the laminated packaging material according to WO97/22536 is per se possible, but would entail an aesthetically unattractive appearance in the package.

Yet a further drawback inherent in the laminated packaging material including barrier layers of, for example, polyvinyl alcohol possibly together with another polymer is that this packaging material cannot be produced employing the same production equipment as in the production of packaging material using aluminum foil as the barrier layer, which involves capital investment costs for new production equipment.

As indicated above, PVOH has environmental benefits as a barrier material. In addition to such synthetic materials, the possibility of using natural and biodegradable polymers (biopolymers) such as starch and starch derivatives, as gas barrier materials has been investigated.

It is previously known that starch possesses some gas barrier properties when employed in relatively thick layers, such as in films having a thickness of about 20 to 30 $\mu$m. Such thick layers of starch material are not suitable for use in packaging laminates however, since they become brittle and are prone to cracking and breaking upon handling, for example in the lamination process and when fold forming of the laminate into packages. Besides not being flexible in handling at manufacturing and distribution, laminates including such thick layers of starch may also absorb moisture and cause delamination between the starch layer and its adjacent layers.

From WO97/16312 it is known that very thin layers of starch applied on to a core layer may provide some gas barrier properties, at least when employed together with an adjacent layer of plastics, which has been united with starch barrier layer by extrusion coating of the plastics material. Two very thin layers of starch, applied in a quantity of 0.5 and 1 g/m$^2$ respectively, dry weight, on to opposite sides of a core layer of paperboard and each extrusion coated with a layer of plastics, provided an oxygen gas barrier of 289 cm$^3$/m$^2$, per 24 h at 1 atm. Similarly, two layers of starch, applied in a quantity of 1 and 1.5 g/m$^2$ respectively, provided an oxygen gas barrier of 141 cm$^3$/m$^2$, per 24 h at 1 atm. The results obtained were thus, comparable with the gas barrier properties of, for example, a 12 $\mu$m thick film of oriented PET, thus representing a 'medium performance barrier' material.

The packaging laminate WO97/16312 is, however, merely a medium performance gas barrier material. This means that it may only be used for packaging of liquid food products during short time periods of cool storage. It is not hitherto known in the prior art to produce packaging laminates having high performance gas barrier properties from starch of or starch derivative barrier materials. It would be much more desirable to be able to provide packaging material having sufficient gas barrier properties for long time storage of liquid food products, i.e. for extended shelf life (ESL) at cool storage or even for aseptic storage. Such desirable high performance oxygen gas barrier properties are in the order of about 50 cm$^3$/m$^2$ at 24 h, 1 atm (23° C., 50% RH) or better, e.g. up to 30 cm$^3$(m$^2$ at 24 h. 1 atm, i.e. oxygen gas barrier properties comparable to those of, for example, PVOH, EVOH (ethylene vinyl alcohol copolymer) or polyamides (PA) when employed at a thickness of the order of about 5 $\mu$m.

FR-A-2684922 discloses coating a polymer film such as polyester with a dispersion of amylose starch containing surfactant and drying the starch at a temperature of up to 180° C. Good gas barrier properties are obtained at coating levels of for instance 0.7 g(dry)/m$^2$. However, there is no indication that similar properties might be obtainable in a laminated packaging material having a paper or paperboard core.

However, although the above gas barrier polymer materials are capable of providing good gas barrier properties in a packaging laminate they are still oxygen-permeable to some degree, while a metal or glass material to be used in canning or bottling has an oxygen permeability of substantially zero. In order to improve the gas barrier properties still further, the polymer gas barrier material may be mixed with an inorganic laminar compound. Such a gas barrier resin composition is for example described in EP-A-590263, wherein excellent high level gas and moisture barrier properties are obtained. EP-A-590263 discloses a process for producing a gas barrier resin composition or its moulded article including a film, the composition comprising a resin and an inorganic laminar compound having a particle size of 5 having a particle size of 5 m or less and an aspect ratio of 50 to 5000, the process comprising dispersing the inorganic laminar compound in a resin or resin solution in the state that the inorganic laminar compound is swollen or cloven with a solvent/dispersant and removing the solvent from the dispersion, if necessary in the form of a film, while keeping the laminar compound in the swollen state.

SUMMARY OF THE INVENTION

We have now found that a laminated packaging material possessing excellent to barrier properties, in particular against gases, may be produced using a method which lends itself to being carried out using conventional production equipment of the type employed in the production of packaging materials with aluminum foil as the barrier layer.

We have also now established that it is possible in a paperboard packaging laminate for liquid food packaging to obtain excellent high performance oxygen barrier properties from the use of a gas barrier composition comprising a dispersible or soluble polymer and an inorganic laminar compound.

Furthermore, by avoiding coating the liquid gas barrier composition onto the core layer in connection with the lamination of the packaging material, we have eliminated the risk of excessive water absorption into the core layer and consequential crack formation when drying the coated core layer of paper or paperboard.

According to a first aspect of the invention, there is now provided a method of producing a laminated packaging material comprising a core layer of paper or paperboard and a barrier layer applied on one side of the core layer, characterised in that a liquid gas barrier resin composition including a dispersion or solution of a polymer and an inorganic laminar compound is applied as a barrier layer on at least one side of a carrier layer and is dried during heating for driving off the dispersant or solvent, whereafter the carrier layer with the applied, dried barrier layer is combined and permanently united with one side of the core layer.

Preferably, the inorganic laminar compound or so-called nanoparticle compound is dispersed to an exfoliated state, i.e. the lamellae of the layered inorganic compound are separated from each other by means of a liquid medium. Thus the layered compound preferably may be swollen or cloven by the polymer dispersion or solution, which at dispersion has penetrated the layered structure of the inorganic material. It may also be swollen by a solvent before added to the polymer solution or polymer dispersion. Thus, the inorganic laminar compound is dispersed to a delaminated state in the liquid gas barrier composition and in the dried barrier layer.

The term clay minerals includes minerals of the kaolinite, antigorite, smectite, vermiculite or mica type, respectively. Specifically, laponite, kaolinite, dickite, nacrite, halloysite, antigorite, chrysotile, pyrophyllite, montmorillonite, hectorite, sodium tetrasilicic mica, sodium taeniolite, commonmica, margarite, vermiculite, phlogopite, xanthophyllite and the like may be mentioned as suitable clay minerals.

The inorganic laminar compound or clay mineral preferably has an aspect ratio of 50–5000 and a particle size of up to about 5 µm in the exfoliated state.

Preferably, the barrier layer is applied by means of liquid film coating with an aqueous composition of a dispersion or solution of a barrier polymer further including the inorganic laminar compound. For example PVOH, or PVOH and EAA, may be applied in the state of an aqueous solution in mixture with an inorganic laminar compound, whilst starch may be applied in an aqueous partially dispersed and/or dissolved state in mixture with the inorganic laminar compound.

Preferably, the barrier layer includes from about 1 to about 40 weight %, more preferably from about 1 to about 30. weight % and most preferably from about 5 to about 20 weight %, of the inorganic laminar compound based on dry coating weight. If the amount is too low, the gas barrier properties of the coated and dried barrier layer will not be markedly improved compared to when no inorganic laminar compound is used. If the amount is too high, the liquid composition will become more difficult to apply as a coating and more difficult to handle in storage tanks and conduits of the applicator system.

Preferably, the barrier layer includes from about 99 to about 60 weight %, more preferably from about 99 to about 70 weight % and most preferably from about 95 to about 80 weight % of the polymer based on the dry coating weight.

An additive, such as a dispersion stabiliser or the like, may be included in the gas barrier composition, preferably in an amount of not more than about 1 weight % based on the dry coating.

The barrier layer is preferably applied on the carrier layer in an amount, depending on the kind of polymer, of approximately 0.5 to 20 g/m$^2$, more preferably approximately 1–10 g/m$^2$, based on dry weight. If the coated amount is too low, the gas barrier properties may be inferior, while if the amount is too high, there is a risk for an inflexible barrier layer and crack formation therein.

The polymer preferably is a high hydrogen-bonding polymer having hydrogen-bonding groups or ionic groups to an extent of 20 weight % and above of the polymer molecule. More preferably, the polymer has functional hydroxyl groups and may for instance be selected from among polyvinyl alcohol (PVOH), ethylene vinyl alcohol (EVOH), polysaccharides such as starch, starch derivatives, carboxyl methyl cellulose and other cellulose derivatives, or a mixture of two or more thereof. Also polymers having nitrogen-containing groups may be employed. Most preferably, the polymer is a polymer having gas barrier properties itself, specifically polyvinyl alcohol, starch or a starch derivative.

Said aqueous polymer dispersion or polymer solution applied as barrier layer may be dried and optionally cured at a web surface temperature of approximately 80 to 200° C. For non-curing materials it is preferred to operate at a temperature of approximately 80 to 1300° C.

Most preferably, materials including PVOH and inorganic laminar compound are preferably first dried at web temperatures from 80 to 160° C. (preferably 140 to 1600° C.) in a first step and are cured at web temperatures from 170 to 230° C. in a second stage resulting in an improved gas barrier at 80% RH. Optionally, the carrier and barrier material may be cooled between the two steps.

A polymer with functional carboxylic acid groups may also be included. This may react with the polymer with functional hydroxy groups during the drying/curing process.

Suitably, the polymer with functional carboxylic acid groups is selected from among ethylene acrylic copolymer and ethylene methacrylic acid copolymers or mixtures thereof.

One particularly preferred barrier layer mixture is of polyvinyl alcohol, ethylene acrylic acid copolymer (EAA) and an inorganic laminar compound. The EAA copolymer is preferably included in the barrier layer in an amount of about 1–20 weight %, based on dry coating weight.

Another particularly preferred barrier layer mixture is of starch or starch derivative and an inorganic laminar compound.

Optionally, the barrier layer is first dried and is then heated to a higher temperature so that the dried barrier layer is cured at a temperature of up to 230° C. preferably approximately about 170° C. The high temperature curing may be of short duration, such as corresponding to web speeds normally used in the packaging laminate production.

The carrier layer may consist of paper or plastics or plastics coated paper and preferred materials are described below. When paper is employed it is preferably thin. In one option the carrier layer preferably consists of paper with a grammage of approximately 5–35 c/m$^2$, e.g. 7–25 g/m$^2$, more preferably approx. 10–20 g/m$^2$.

The carrier layer bearing the barrier material and the core layer may be assembled together in various ways.

The carrier layer bearing at least one said barrier layer may be combined and united with the core layer by extrusion of a layer of thermoplastics therebetween.

Where said carrier layer bears a said barrier layer on one side thereof it therefore may be combined with the core layer by extrusion of a layer of thermoplastics between the carrier layer and the core layer.

An outer layer of thermoplastics, preferably polyethylene, is then applied on the barrier layer by means of extrusion.

When the carrier layer bears a said barrier layer on one or both sides it may be combined with the core layer by extrusion of a layer of thermoplastics between the core layer and a said barrier layer.

If said carrier layer bears a said barrier layer on both sides thereof, a layer of thermoplastics may then be applied to the outer layer of barrier material by extrusion.

The layer of plastics applied between the core layer and the carrier layer or a said barrier layer may include a substance functioning as light barrier. This is especially preferred when the carrier layer is of paper or other visually non-transparent material.

We have also established that it is possible in a packaging laminate to obtain high performance oxygen barrier properties from the use of a gas barrier composition comprising a dispersion of starch and similar materials and an inorganic laminar compound.

A gas barrier layer including starch and inorganic laminar compound is preferably applied at a dry coating weight of from 0.5 to 5 g/m$^2$, more preferably 0.5 to 3 g/m$^2$ e.g. from 1.5 to 2 g/m$^2$.

It is acceptable to include minor amounts of other polymeric materials which do not interfere with the desired properties of the composition of starch and inorganic laminar compound. For instance the gas barrier layer may further comprise a minor amount of water soluble or water dispersible polymers having functional hydroxyl groups, e.g. polyvinyl alcohol, and carboxyl group containing polyolefins such as ethylene acrylic acid, or a mixture thereof. The amount of such materials may be from 0 to 30%, e.g. 0 to 20% or 0 to 10% by weight.

Preferably, packaging laminates including starch in the barrier layer comprises a layer of plastics polymer, preferably a thermoplastics, e.g. polyethylene, laminated directly with the said gas barrier layer. Most preferably, said polymer is LDPE. Other thermoplastics that may be employed include all other kinds of polyethylene (including LLDPE, ULDPE, VLDPE, M-PE and HDPE), polyproplylene, and polyethyleneterephthalate.

We have observed that when polyethylene is applied to a layer based on starch at a high temperature, e.g. over 200° C., the gas barrier properties are improved and that under appropriate conditions can be made to reach or move further into a high performance level. According to the invention, the preferred method of obtaining optimal properties is to apply the barrier composition based on starch or starch derivative not to a thick core layer as in WO97/16312 but to a separate carrier. Suitably then, the gas barrier layer is carried by a carrier layer of paper or plastics.

When paper is employed it is preferably thin, e.g. said carrier layer may be of paper having a surface weight of from 5 to 35 g/m$^2$, preferably from 10 to 25 g/m$^2$. The paper may also be coated beforehand with a layer of plastics.

After application of the liquid composition of starch and inorganic laminar compound, the carrier may be combined with a thicker core material so that the packaging laminate comprises a core layer having said carrier layer on one surface side thereof. There may be one or more layers including a heat sealing layer on the other surface side of said core layer.

The surface of the carrier layer to which the starch or starch derivative composition is applied is preferably substantially impervious to said liquid vehicle.

The degree to which the surface is impervious may be measured by measuring surface adsorption, e.g. in Cobb units. ("Cobb"=g(water)/m$^2$ adsorbed on to the surface in 60 seconds exposure to liquid water). Adsorption of other liquids could be measured in an analogous method. The method of measuring Cobb adsorption is defined in SCAN P12–64 and in TAPPI T441. The surface adsorption of plastics is generally about 1 Cobb, whilst a smooth paper surface will generally have an adsorption of about 20 to 30 Cobb. Suitably, for use in the invention the substrate surface should have an adsorption of 50 Cobb or less, preferably an adsorption of 30 Cobb or less, more preferably an adsorption of less than 20 Cobb or most preferably an adsorption of 10 Cobb or less, e.g. less than 5 Cobb.

Preferably, the surface of the carrier layer to which the composition of polymer and inorganic laminar compound is applied has a smoothness of 200 Bendtsen or better. The method of measuring Bendtsen smoothness is defined in SCAN (Scandinavian Pulp and Paper Norms) P21–67 and in TAPPI UM535.

Where the substrate is plastics or has a plastics surface, such desired smoothness is usually obtained, such as in, for example, a film of plastics or a plastics coated paper carrier layer.

One reason why a high performance barrier property was not achieved in WO97/16312 may be that the paperboard core layer lacked the requisite degree of impermeability so that the aqueous solution of starch which was employed may have penetrated the surface. This might have an adverse action in a number of ways. There may not then be a smooth and unbroken surface to the starch layer because of penetration as such into the paperboard. Alternatively, or additionally, drying of the paperboard to dry the starch layer may cause surface deformation of the paperboard and hence cracking of the starch layer. These problems are obviated when the starch is applied to a separate, smooth, impervious carrier layer which is subsequently laminated to the core layer.

The paperboard used in WO97/16312 would typically be expected to have had a surface smoothness of 500–600 Bendtsen. This may in itself have been sufficient to prevent the starch layer being smooth and unbroken or from having thin areas providing a path for oxygen transmission.

In order to avoid cracks, punctures or deformations in the barrier composition layer of starch or starch derivative layer and inorganic laminar compound, it is preferred that the surface on to which it is applied is smooth, e.g. that the substrate surface has a smoothness of 200 Bendtsen or better (i.e. less), e.g. from up to 150 Bendtsen, most preferably up to about 100 Bendtsen.

The materials described as carrier for use with starch can also be used with the other barrier materials used according to the first aspect of the invention. However, generally a plastics film carrier or a plastics coated thin paper carrier is preferred when using starch and the use of a thin paper or a plastics coated thin paper carrier is preferred for barrier materials such as PVOH which may be heated to temperatures well above 100° C. for drying and curing.

Starch for use in the invention may be of any conventional type although certain starches provide better results than others under the conditions we have used. Modified potato starch is preferred, such as Raisamyl 306 (Raisio) which is hypochlorite oxidised. Other acceptable starches include corn starch and derivatives, such as Cerestar 05773 a hydroxypropylated corn starch.

Starch derivatives that are suitable for use in the invention include oxidised starch, cationic starch and hydroxpropylated starch.

It will be understood that when the gas barrier property of the packaging laminates of the invention is referred to as being provided by a particular material, e.g. a composition of starch or a starch derivative and an inorganic laminar compound, this does not exclude the case where the gas barrier property is the result of an interaction between the stated material and an adjacent layer in the laminate, rather than a bulk property of the stated material viewed in isolation.

It may be that a contributing mechanism in the improvement in barrier property noted when polyethylene is applied at a high temperature to a layer of starch comes from penetration of polyethylene molecules into the starch, replacing water in starch crystals. Other polymers producing a similar effect may be used.

Said plastics layer may be applied to said composition of starch or starch derivative and inorganic laminar compound by melt extrusion or may be applied as a preformed film by hot pressure lamination e.g. with a heated roller. Generally, any technique may be employed in accordance with this preferred embodiment that provides the required modification of the barrier property of the starch.

Preferably said plastics layer is bonded to the layer of starch or starch derivative and inorganic laminar compound at a temperature of at least 200° C., preferably from 250 to 350° C. most preferably from 250 to 330° C.

According to a second aspect of the invention, a laminated packaging material is provided, which is produced according to the method of the invention.

According to a third aspect of the invention, a packaging container is produced by fold formation of a sheet or web-shaped laminated packaging material obtained by the method according to the invention.

By applying, in a separate production stage, a liquid composition of a polymer dispersion or polymer solution and an inorganic laminar compound as a barrier layer on at least one side of a carrier layer and drying the barrier layer during heating for driving off the liquid medium, preferably water, and thereafter combining and permanently uniting the carrier layer with the applied, dried barrier layer to one side of the core layer, there will be realised a laminate packaging material with a barrier layer possessing superior barrier properties.

Thanks to the fact that the barrier layer is not dried or cured at elevated temperature in connection with the lamination of the packaging material, the risk of excessive water absorption into the core layer and of drying of the core layer of paper or paperboard—with consequential risk of crack formation in the core layer—is wholly eliminated.

Given that the plastics layer applied between the core layer and a paper carrier layer may include a substance serving as light barrier, ideally carbon black, a light barrier layer will be realised whose unattractive black appearance may be concealed in a layer between the core layer and a thin paper layer carrying the barrier layer.

One important advantage of the method according to the aspect of the present invention is that the barrier layer produced in a separate stage may be employed in the production of a laminated packaging material in a corresponding manner and using corresponding production equipment as are employed today in the production of packaging materials with aluminum foil as the oxygen gas barrier.

BRIEF DESCRIPTION OF THE DRAWINGS

The present invention will now be described in greater detail herein below, with the aid of non-restrictive examples of methods, as well as packaging laminates—obtainable by the method, according to preferred embodiments of the present invention and with reference to the accompanying drawings, in which.

DETAILED DESCRIPTION OF THE INVENTION

Figure 1:
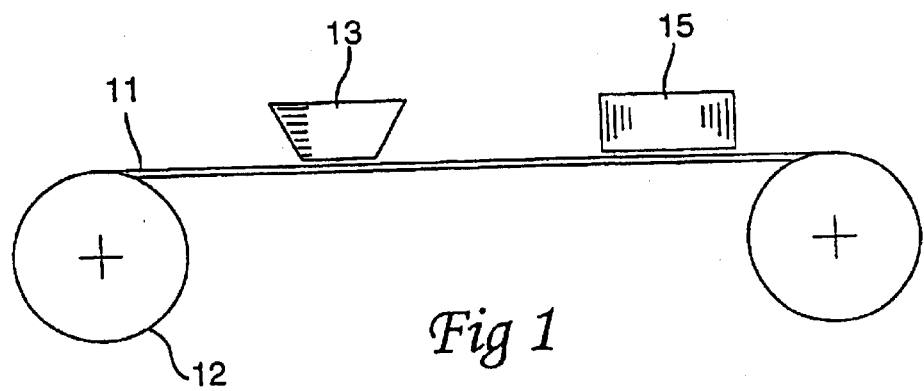
FIG. 1 schematically illustrates a method of producing a carrier layer with a barrier layer according to the present invention applied thereon.
Figure 2:
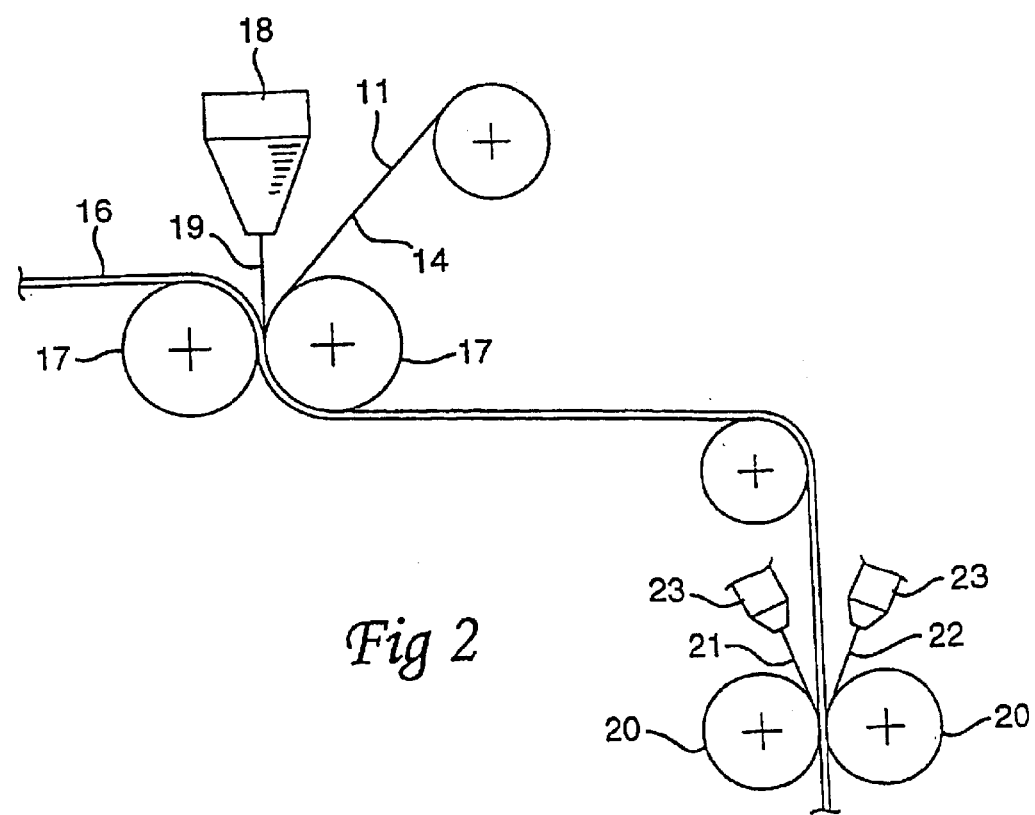
FIG. 2 schematically illustrates a method of producing a laminated packaging material according to the present invention.
Figure 3:
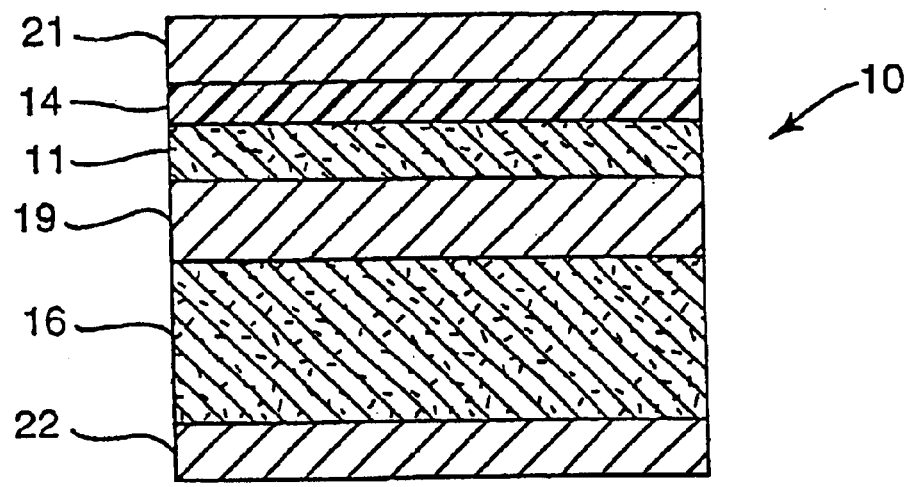
FIG. 3 is a cross sectional view through a laminated packaging material according to the present invention.

Referring to the Drawings, FIGS. 1 and 2 schematically illustrate a method according to the present invention chosen by way of example for producing a laminated packaging material 10 shown in FIG. 3. A web of a carrier layer 11, for example of thin paper, which may preferably be coated with a thin layer of plastics, is unwound from a magazine reel 12 and led past an applicator 13 (ideally a liquid film coating apparatus) disposed adjacent the web, by means of which at least one barrier layer 14 of an aqueous composition comprising a dispersion or solution of a polymer and an inorganic laminar compound is applied on the one side of the carrier layer 11 in the form of a substantially cohesive barrier layer 14. In the case of a plastics coated paper carrier layer, the polymer dispersion or solution is preferably applied to the plastics coated side. The quantity of applied solution may vary, but is preferably in such an amount that a thoroughly integrated and substantially unbroken layer is formed after drying, for example approx. 0.5–20 g/m$^2$, preferably 1–10 g/m$^2$, based on dry weight.

Where a composition of PVOH and inorganic laminar compound is used, the carrier layer 11 preferably consists of a layer of thin paper with a grammage of approx. 5–35 g/m$^2$, preferably 7–25 g/m$^2$, more preferably 10–20 g/m$^2$, but may also be a plastics film. However, thin paper enjoys the advantage that it does not alter dimensions on temperature increases in connection with drying and possible curing, which does not apply to plastic. Generally, where the polymer applied is to be cured at above about 130° C., the use of plastics film as carrier layer is not recommended.

The barrier layer 14 is applied on the carrier layer 11 in the form of an aqueous composition, comprising a polymer dispersion or polymer solution and an inorganic laminar compound, the composition including a polymer with those properties which are desired to be added to the packaging laminate in the form of a coated layer, for example a polymer with functional hydroxyl groups, for instance polyvinyl alcohol, ethylene vinyl alcohol, starch, starch derivative, carboxy methyl cellulose and other cellulose derivates or mixtures thereof.

The barrier layer 14 may also include a hydrophobic polymer as described in WO97/22536, for example a styrene butadiene copolymer.

The barrier layer 14 may also include a polymer with functional groups which are reactive with the functional hydroxyl groups in the abovementioned polymer, for realising a cross-linked barrier layer 14. Such polymers may be polyolefins modified with carboxyl acid groups or graft copolymers with monomers containing carboxyl acid groups in an olefin homo- or copolymer. Alternatively, such polymers may be random selected copolymers of olefin monomers and monomers containing functional carboxylic acid groups, such as carboxylic acids, carboxylic acid anhydrides, metal salts of carboxylic acids or derivatives thereof. Specific examples of suitable functional polyolefins include polyethylene and polypropylene homo- or copolymers grafted with maleic acid anhydride, ethylene acrylic acid (EAA) or ethylene rhetacrylic acid (EMAA), or random selected copolymers.

It is particularly preferred that the barrier layer 14 includes a mixture of polyvinyl alcohol, ethylene acrylic acid copolymer and an inorganic laminar compound. The mixing ratio between polyvinyl alcohol and ethylene acrylic acid copolymer in the barrier layer 14 should be such that the polyvinyl alcohol may form a blanket protection against gas transport in the packaging laminate, at the same time as the quantity of ethylene acrylic acid copolymer should be sufficient to form a cohesive phase which partly protects the polyvinyl alcohol and partly effectively counteracts or prevents the transport of liquid through the polymer of the barrier layer 14.

According to another preferred embodiment, the barrier layer 14 includes a mixture of starch and an inorganic laminar compound.

The web of carrier layer 11 is led, after coating, further past a drying apparatus 15, e.g. an IR drier or a hot air drier which acts on the coated side of the carrier layer 11 for driving off water and drying the applied barrier layer 14 at web surface temperature of approx. 80-100°C. preferably approx. 90-95°C. and, where applicable, a curing temperature for cross-linking the functional groups included in the coated polymer mixture, a web surface temperature of up to approx. 190°C. preferably 170°C.

Finally, the finished carrier layer 11 with the applied barrier layer 14 is rolled up and may subsequently be stored or employed direct in a conventional lamination process for the production of a laminated packaging material 10 possessing superior barrier properties.

The carrier layer 11 with the applied barrier layer 14 may ideally be employed for the production of packaging material 10 in a corresponding manner and using corresponding production equipment to that employed in the production of packaging material with aluminum foil as the barrier layer. FIG. 2 shows a web of a configurationally rigid but foldable core layer with a grammage of approx. 100–500 g/m$^2$, preferably approx. 200–300 g/m$^2$, which may be a conventional fiber layer of paper or paperboard of suitable packaging qualities. The core layer 16 is led through the nip between two rotating rollers 17 and is united with a web of carrier layer 11 with dried or cured barrier layer 14, during the application—employing an extruder 18—of one or more layers of extrudable thermoplastic 19, preferably polyethylene, between the core layer 16 and the carrier layer 11. As shown, the barrier material 14 is preferably for the outer face of the carrier layer but it may alternatively be on the inner face.

The thus laminated web is finally led through the nip between two rotating rollers 20 under the simultaneous application of thin layers 21, 22 of extrudable thermoplastics, preferably polyethylene, against both outer sides of the web employing extruders 23, the finished laminated packaging material 10 according to the present invention obtaining the cross-sectional structure schematically shown in FIG. 3. Alternatively, two extruders 23 may be disposed in sequence for the consecutive extrusion of thin layers 21 and 22 of thermoplastic on the respective outer sides of the laminated web.

The two plastics layers 21 and 22 have for their purpose, on the one hand, to protect the packaging material 10 from the penetration of moisture and damp from the outside and, also the crucial function of rendering the packaging material sealable by conventional so-called thermosealing, whereby mutually facing layers of plastic may be joined together under the supply of heat and pressure by surface fusion. The thermosealing operation realises mechanically strong, liquid-tight sealing joints during the conversion of the packaging material into finished packaging containers.

The outer plastics layer 22 which is applied on the packaging material 10 on that side of the core layer 16 which, in the finished packaging container, is intended to be turned to face towards the outside may be provided with a suitable print of a decorative and/or informative nature for identifying a packed product.

Figure 4:
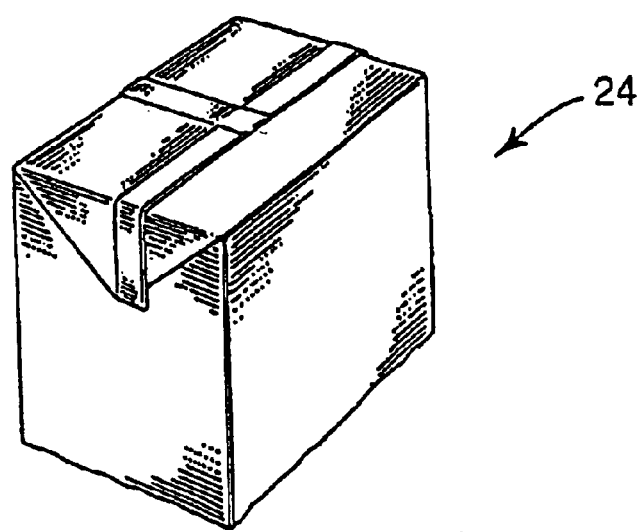
FIG. 4 is a perspective view from above of a conventional, configurationally stable packaging container which is produced from a laminated packaging material according to the present invention.

From the laminated packaging material according to the present invention, liquid-tight, dimensionally stable packages possessing superior oxygen gas barrier properties may be produced employing known packaging and filling machines which, in a continuous process form, fill and seal the material into finished packages 50. An example of such a conventional, packaging container 50 is shown in FIG. 4.

By first uniting the longitudinal edges of a web-shaped laminated packaging material 10 into a tube which is filled with the contemplated contents, whereafter individual packages 50 are separated from the web by repeated transverse sealing of the tube below the level of the contents. The packages 50 are separated from one another by incisions in the transverse sealing zones and obtain the desired geometric configuration, normally parallelepipedic, by a final fold formation and sealing operation.

It should be noted that the various packaging laminates according to the invention may comprise a multiple number of layers in addition to those shown in the drawings. It will thus be obvious to a person skilled in the art that the number of layers may vary and that the description oil the illustrated embodiments should not, therefore, be considered as restrictive of the present invention.

Figure 5A:
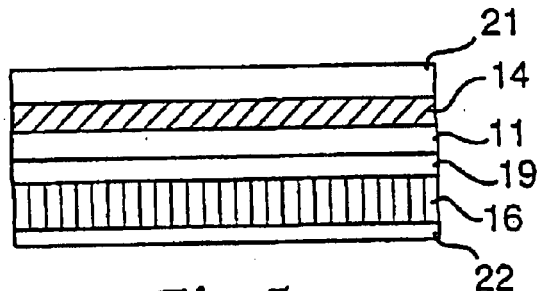
FIG. 5 (a,b,c,d) schematically illustrate cross-sections of four different packaging laminates according to specific embodiments of the invention.
Figure 6A:
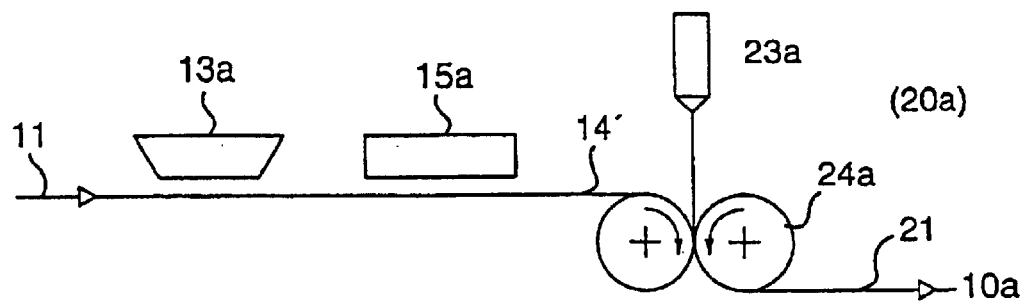
FIG. 6 (a,b,c,d) schematically illustrate the methods of manufacturing of the respective packaging laminates as described in FIG. 5.

FIG. 5a schematically illustrates a cross-section of a packaging laminate according to a simple embodiment of the intention, carrying the generic reference numeral 10a, while FIG. 6a schematically illustrates the method (denoted 20a) of manufacturing of the carrier layer structure used in the laminate 10a. The laminate 10a comprises a carrier layer 11, whose surface has a smooth, essentially non-absorbing texture. The carrier layer 11 may be a plastics film or a thin paper having said surface qualities. A thin paper substrate having a surface weight of about 5–35 g/m$^2$ is not able to absorb much from the liquid barrier composition, both since it is very thin and since such commercially available thin papers usually have very smooth and glossy, hard surfaces. A particularly suitable paper for this purpose is so-called glassine paper, which, however, is rather expensive compared to other commercially available papers. Suitably, the paper may be MG Kraft paper (Munksjö) of from about 5 to about 35 g/m$^2$ surface weight, MG indicating that the paper is smooth on one surface, which is where the starch should be app: lied preferably. When the barrier composition includes starch or a starch derivative, the carrier layer 11 most preferably is a plastics film or a plastics coated thin paper carrier since it has the most advantageous surface properties.

A thin layer of an aqueous composition, comprising a solution or dispersion of starch and an inorganic laminar compound, is applied on to the upper side of a web of substrate layer 11, which is led in the direction of the arrow from a magazine reel (not shown) to a coating station 13a. The aqueous composition is preferably applied by means of liquid film coating technology, also called "dispersion coating" or "Wet coating", which is well known in the prior art of coating of aqueous solutions and dispersions, but also other coating methods are feasible according to the invention, depending on the viscosity of the composition. The aqueous composition including starch preferably is applied in such a quantity that the applied and dried barrier layer 14 has a thickness/surface weight of from about 0.5 to about 3 g/m$^2$.

The web coated with aqueous solution is led further to a drying station 15a at which the web is dried with aid of a drying apparatus for removing water from the applied aqueous starch solution. Drying may be carried out by any conventional drying apparatus such as an infra-red (IR) drier or an air drier. Preferably, drying takes place at a temperature of about 80–100° C.

From the drying station the dried web, having an upper layer 14 of starch and inorganic laminar compound, is led further to an extruder station at 23a at which the web and barrier layer is further laminated to a layer of plastics 21. The lamination of the starch surface to the plastics layer is carried out by means of surface fusion between the plastics layer and the layer including starch 14, which is obtained by simultaneous application of heat and the plastics. Preferably, molten polymer is extruded on to the dried starch layer at the same time as the web is led through the nip between two rotary cooling rollers 24a, thus forming a finished packaging laminate providing the upper three layers of the packaging laminate 10a as shown by a cross-section view in FIG. 5a, having an outer layer of plastics 21, laminated to the starch layer 14. The extruded plastics material is (preferably) a thermoplastic polymer, preferably a polyethylene and most preferably LDPE, which enables efficient conversion of the packaging laminate 10a into liquid-tight, dimensionally stable packages by heat sealing. The extrusion temperature should be at least 200° C., preferably from about 250° C. to about 330° C.

Alternatively, said surface fusion between the starch layer 14 and the plastic layer 21 may be obtained by laminating a pre-manufactured film of thermoplastic to the dried starch layer 14 by means oil simultaneous application of heat and pressure, preferably by means of leading the starch coated substrate and the plastic film together through a hot roller nip, whereby the temperature supplied by the hot rollers is at least 200° C. and up to about 350° C., preferably from about 250° C. to about 330° C.

The three layer laminates so produced may then be laminated to a paperboard core 16 as shown in FIG. 5a, by means of extrusion lamination with an intermediate layer 19 of thermoplastic polymer, preferably polyethylene, to produce the packaging laminate 10a.

Figure 5B:
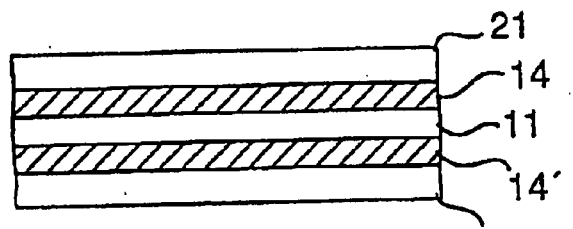
Figure 6B:
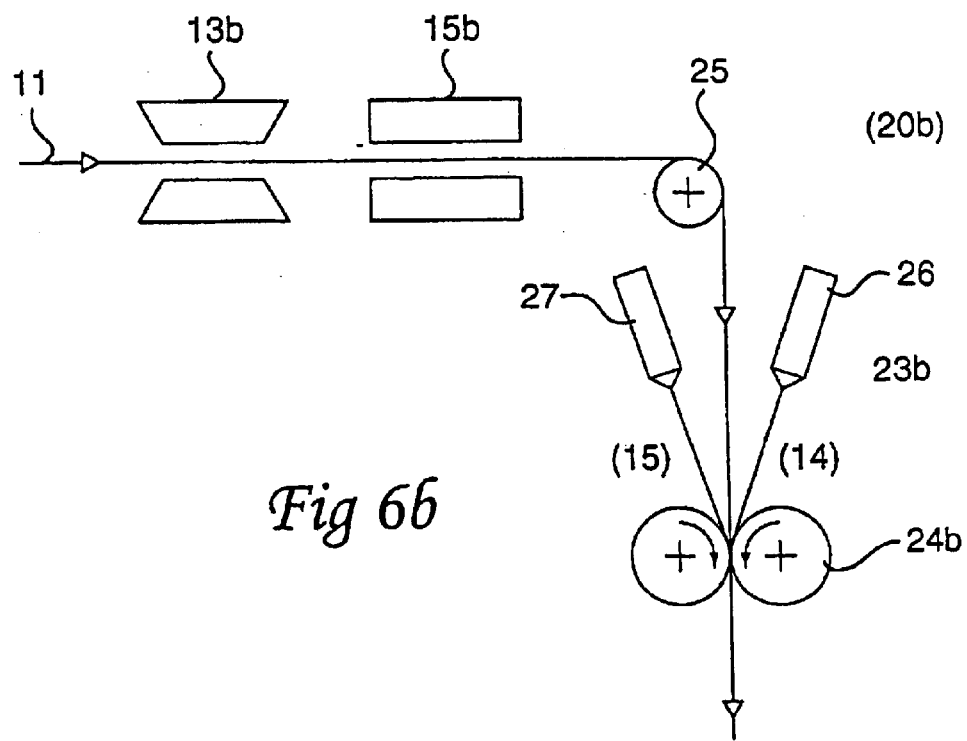

FIG. 5b schematically illustrates a cross-section of a packaging laminate 10b according to another embodiment of the invention and FIG. 6b schematically illustrates the method (denoted 20b) of manufacturing of the laminate 10b.

According to this embodiment of the invention, the substrate or carrier layer 11 is coated on both sides by an aqueous barrier composition in the same way as described in the embodiment of FIGS. 5a and 6a.

Consequently, the packaging laminate 10b, which has been manufactured by the method of FIG. 6b, comprises a carrier layer II as defined above, a thin layer of barrier composition (14, 14') applied on to each side of the substrate layer 11 and the outer layers of plastics (21, 21') laminated to the outer sides of respective barrier layer. In the case of starch in the barrier layer, the outer layers of plastics are applied by means of surface fusion with the starch barrier layer obtained by simultaneous application of heat as described above. With such a layer structure, a double gas barrier effect should be obtained.

Accordingly, with the method of FIG. 6b, a thin layer of an aqueous barrier composition is applied on to each side of a web of a carrier layer 11, which is led in the direction of the arrow from a magazine reel (not shown) to a coating station 13b. An aqueous composition including starch and an inorganic laminar compound is preferably applied by means of dispersion coating technology in such a quantity on to each side of the substrate layer 11, that the applied and dried starch layers 14, 14' each have a thickness/surface weight of from about 0.5 to about 3 g/m².

An aqueous composition including PVOH and an inorganic laminar compound is preferably applied in such a quantity that the applied and dried starch layers 14, 14' each have a thickness/surface weight of from about 1 to about 10 g/m².

The web coated with aqueous solution is led further to a dying station 15b at which the web is dried with the aid of a drying apparatus for removing water from the applied layers of aqueous starch solution. Preferably, drying takes place at a temperature of about 80–100° C., as described above. Optionally, the dried barrier layer is then cured at a higher temperature as described above.

From the drying station the dried web, having an upper barrier layer 14 and a lower barrier layer 14', is led further via a bending roller 25 to an extruder station at 23b at which the web is further coated with a layer of plastics on each side. Thus the layers of plastics 21 and 21' are applied by means of respective extruders 26, 27 operating on each side of the web. The molten polymer is extruded on to the dried barrier layers at the same time as the web is led through the nip between two rotary cooling rollers 24b, in principle as described above, thus forming a finished packaging laminate 10b as shown by a cross-section view in FIG. 5b. The laminate 10b is united with a core layer, and formed to a finished package as shown in FIG. 4.

Figure 5C:
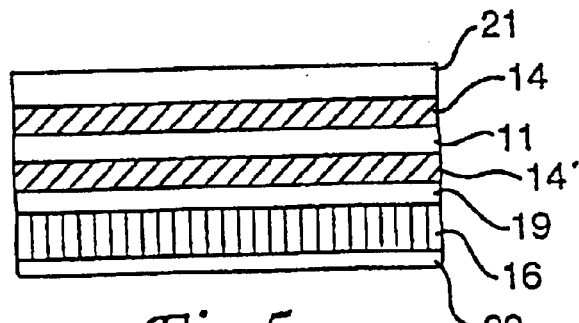
Figure 6C:
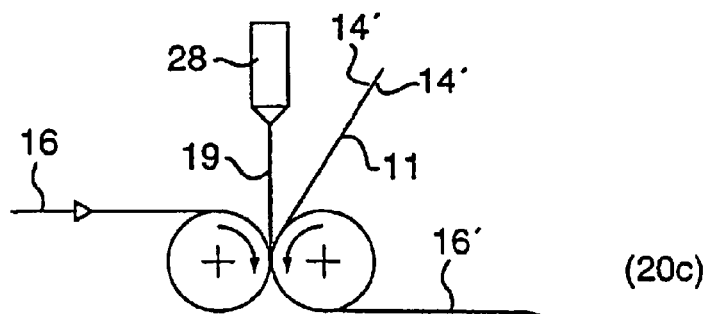
Figure 6C:
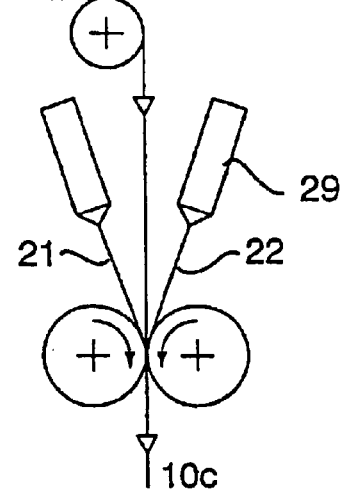

FIG. 5c thus schematically illustrates a cross-section of a packaging laminate 10c according to an alternative embodiment of the invention while FIG. 6c schematically illustrates the method (denoted 20c) of manufacturing of the laminate 10c.

A paper or paperboard core layer for use in the invention usually has a thickness of from about 100 pm up to about 400 pm, and a surface weight of approximately 100–500 g/m², preferably about 200–300 g/m².

According to the method 20c, a first web of the core layer 16, is led in the direction of the arrow from a magazine reel (not shown) to an extrusion lamination station 28 at which a second web of the substrate layer 11 having a dried layer of barrier composition applied on to each side 14, 14' is superposed and laminated to the core layer by means of an intermediate melt extruded lamination layer 19 of a thermoplastics polymer, preferably a polyethylene and most preferably LDPE.

The web of laminated core, barrier and carrier layers 16' is further led to an extruder station 29 at which an outer layer of thermoplastics 21, 22, such as preferably LDPE, is further extruded on to each side of the laminate 16, such that the barrier layer on the outer side of the substrate layer 11. which is opposite to the side which is laminated to the core layer, as well as the opposite side of the core layer 16, are both coated by the extruded thermoplastics, thus forming layers 21 and 22.

Suitable thermoplastics for the outer layer 14 are polyolefins, preferably polyethylenes and most preferably low density polyethylenes such as, for example LDPE, linear LDPE (LLDPE) or single site catalyst metallocene polyethylenes (m-PE). The outer layer 22, which eventually will form the outside of the packaging container manufactured from the packaging laminate, may alternatively be applied on to the core web 16 in a step before the coating and drying steps of the barrier composition.

Figure 5D:
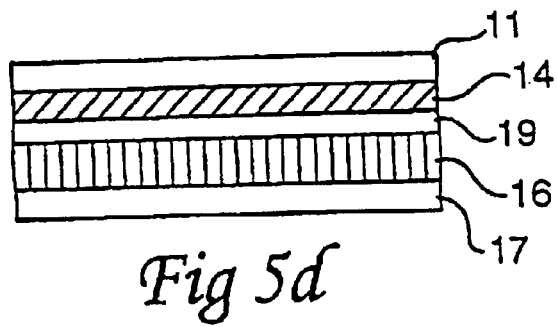
Figure 6D:
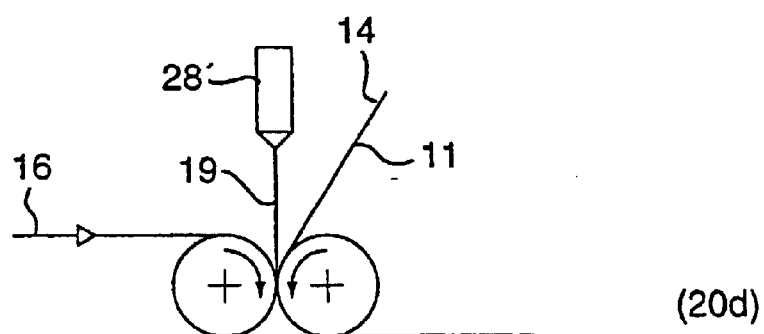
Figure 6D:
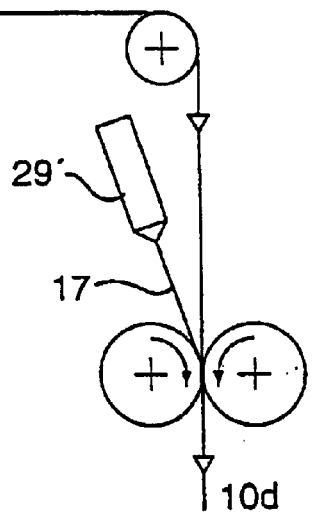

FIG. 5d schematically illustrates a cross-section of a packaging laminate 10d according to another embodiment of the invention while FIG. 6d schematically illustrates the method (denoted 20d) of manufacturing of the laminate 10d. The packaging laminate 10d is manufactured by applying and drying of a thin layer of an aqueous barrier composition comprising a dispersion or solution of a polymer and an inorganic laminar compound 14 on to the upper side of a carrier layer 11, which is constituted of a plastic E film, as described in the method 20a above, in an initial step.

According to the method 20d, a first web of the core layer 16, is led in the direction of the arrow from a magazine reel (not shown) to an extrusion lamination station 28' at which a second web of the carrier layer 11 having a dried layer of barrier composition applied on to one side, is super-posed such that the barrier layer 14 is directed towards the core layer and laminated to the core layer by means of an intermediate melt extruded lamination layer of a thermoplastics polymer, preferably a polyethylene and most preferably LDPE. The carrier layer 11, i.e. the plastics film, may form an outer layer of the packaging laminate to be directed inwards in a packaging container manufactured therefrom, thus providing a container inside layer. In a final extruder station 29', the outer thermoplastic layer 17 is applied by means of extrusion coating.

A problem of the laminates for example described in WO97/16312 is that their manufacture would require completely different machinery in the lamination and converting process to that of the paperboard laminates using aluminum foil as a gas barrier which are in conventional use. Such packaging laminates are made by extrusion laminating a paper board substrate to the barrier foil using polyethylene. In contrast, as can be seen from the above, a carrier layer of plastics or thin paper bearing a barrier composition comprising a hydrogen-bonding polymer and an inorganic laminar compound coating on one or both faces, with or without plastics already applied to the starch layer or to one or both of them, can simply be substituted for the aluminum foil in conventional machinery with minor adjustment. The preparation of the gas barrier bearing carrier material can be done completely separately in another facility if need be so that an existing converting line in a factory can readily be adapted to use the new materials.

Thus a further important advantage by a preferred embodiment of the method illustrated, is that the steps of application and drying of the liquid gas barrier composition may be performed off the lamination processing line, thus avoiding costly modifications and re-construction of the lamination equipment in the manufacturing of packaging laminates having a core layer. By applying the barrier layer on to a thin carrier layer such as a plastics film or a thin paper having a smooth, essentially non-absorbing surface, in the sub-sequence lamination with further layers of plastics and a core layer, the lamination operation may be performed using the safe equipment and process as is used today, when laminating for example aluminum foil and inside layers.

From sheet or web-shaped, preferably pre-creased and colour decorated, blanks of the packaging laminate 10, liquid-tight, dimensionally stable packages of the single-use disposable type are produced in accordance with—conventional "form-fill-seal" technology, according to which the packages are formed, filled and sealed by means of modern, rational packaging and filling machines. From, for example, a web of the packaging laminate, such packages are produced in that the web is first reformed into a tube, by both longitudinal edges of the tube being united with another by heat sealing in a longitudinal overlap joint seal. The tube is filled with the pertinent contents, for example liquid food, and is divided into individual packages by repeated transverse sealings of the tube, transversely across the longitudinal axis of the tube, beneath the level of the contents in the tube. The packages are finally separated from one another by transverse incisions along the transverse seals, thus forming pillow-shaped sealed packages. The pillow-shaped packages may be distributed as such or first be given a desired geometric, normally parallelepipedic form by an additional forming and heat-sealing operation in a per se known manner.

Using the methods and materials described above by applying an aqueous barrier composition comprising a dispersion solution of starch or a derivative and an inorganic laminar compound on to a substrate layer for supporting the barrier layer, which consists of a specifically chosen material, in combination with subsequent drying and lamination to a layer of plastics by heat fusion of the plastics surface, highly improved oxygen gas barrier properties are obtained in packaging laminates compared to those of WO97/16312. The improvement in the gas barrier properties of the laminated barrier layer has been improved radically into an excellent so called high performance barrier layer. The best gas barrier results have been obtained when the substrate layer consists of a polymer or has a polymer coated surface, but also a thin paper layer having a surface weight of approximately 7–35 $g/m^2$ with smooth, essentially non-absorbing surfaces, will provide improved gas barrier properties compared to those previously known in connection with compositions including starch.

Optimal gas barrier properties in the case of a barrier composition comprising starch are obtained when using a carrier layer of plastics or having a surface of plastics are, which is believed to be at least partly the result of the quality of the surface, i.e. smoothness and liquid repellence. Whilst the mechanism of the effect obtained using a fusion bonded interface between starch polymer and plastics layers is not fully understood, the optimal gas barrier properties may also partly be the result of there being such an interface formed on both sides of the starch-containing layer, since the carrier layer to which the starch-containing composition is applied is a plastics layer and the same kind of phenomenon may occur at this interface upon the application of heat to the starch-containing layers and plastics layers.

A starch-containing gas barrier layer according to the invention is advantageously applied in an amount of from about 0.5 to 5 $g/m^2$, dry weight. At amounts lower than 0.5 $g/m^2$, the tolerances of the layer thickness as well as the gas barrier properties will become less reliable. On the other hand, at amounts exceeding about 3 $g/m^2$, the risks that the starch-based barrier layer may become brittle and inflexible will increase. However, amounts applied of up to about 5 $g/m^2$, dry weight, are possible and for some type of packages and uses even higher amounts might be acceptable. The gas barrier property of the starch-composition layer generally improves with increasing thickness. The optimal and preferred applied amount of starch ranges from about 1.5 to about 2 $g/m^2$.

PREPARATION EXAMPLE 1

An aqueous dispersion of from about 1–5 weight % exfoliated flake shaped mineral particles (natural, e.g. Montmorillonite, or synthetic, e.g. Laponite) having an aspect ratio of about 50–5000, is blended with an aqueous solution of about 5–30 weight % of PVOH (having a molecular weight of 16000–200000 g/mol and a saponification degree of 95–100%) at 60–90° C. during 2–8 hours. The dispersion of exfoliated laminar mineral particles may be stabilised by means of a stabiliser additive. Alternatively, the laminar mineral particles are exfoliated in the PVOH-solution at 60–90° C. during 2–8 hours. Aqueous ethylene acrylic acid copolymer dispersion is added to the aqueous mixture of PVOH and mineral particles. The resulting mixture is dispersion coated by from about 1 to about 10 $g/m^2$ based on dry coating weight onto a thin plastic coated paper carrier layer. The wet coating is applied as a solution/dispersion in water and dried at a web surface temperature of 100–150° C. followed by curing at 170–190° C.

PREPARATION EXAMPLE 2

In preparing the barrier material/carrier material element, starch was prepared for use in coating from a dry powder state by mixing 10 wt % of starch with water at ambient temperature to form a slurry.

An aqueous dispersion of from about 1–5 weight % exfoliated flake shaped mineral particles (natural, e.g. Montmorillonite, or synthetic, e.g. Laponite) having an aspect ratio of about 50–5000, is blended with the aqueous solution/dispersion of starch at 60–90° C. during 2–8 hours. The dispersion of exfoliated laminar mineral particles may be stabilised by means of a stabiliser additive. Alternatively, the laminar mineral particles are exfoliated in the starch slurry at 60–90° C. during 2–8 hours.

The resulting slurry of starch and mineral particles was heated with mixing to from 90 to 95° C. and kept at that temperature for 30 minutes. During heating the starch swelled.

If possible, e.g. with Raisamyl 306 (Raisio), the starch was cooled to ambient before use in coating. However, where this would have caused the starch to gel, e.g. with CERESTAR, the starch composition was coated hot (60').

A wet weight of approximately ten times the desired dry coating weight was applied to the carrier layer in web form by means of a liquid film coating/dispersion coating method.

For the starch-containing composition a first drying stage using IR heating to a web surface temperature of 80 to 100° C. was used to speed the drying process followed by a hot air drying step in which the starch coating was hot air dried at web speed of 1 m/min at a temperature of 110° C. Generally, a web surface temperature of 80 to 110° C. is suitable depending on the linespeed.

Preferably, the dried starch layer was extrusion coated with LDPE. About 25 g/m² of LDPE was extruded on to the dried starch, layer at about 200 m/minute, 325° C., cooling roller at 10–15° C., as above. The distance between the extrusion die to the web was normally 10–30 cm. The extruded LDPE hit the web just before entering between the cooling roller and the counter pressure roller.

It will be obvious to a person skilled in the art that the present invention is not restricted to the illustrated embodiment, but that various modifications and alterations thereof may be put into effect without departing from the scope of the inventive concept as this is defined in the appended claims. For example, the packaging material structures illustrated are naturally, not restricted to the illustrated number of layers, but this number may be both greater and smaller, and may also be freely varied in response to the desired filed of use of the packaging material.

What is claimed is:

1. A method of producing a laminated packaging material comprising a core layer of paper or paperboard and a barrier layer applied on one side of the core layer, wherein a liquid barrier composition including a dispersion or solution of a polymer and an inorganic laminar compound is applied as a barrier layer on at least one side of a carrier layer consisting of paper, said at least one side of the carrier layer having a smoothness of up to about 175 Bendtsen, and said liquid barrier composition is dried during heating for driving off the dispersant or solvent, whereafter the carrier layer with the applied, dried barrier layer is combined and permanently united with one side of the core layer.

2. A method of producing a laminated packaging material comprising a core layer of paper or paperboard and a barrier layer applied on one side of the core layer, wherein a liquid barrier composition including a dispersion or solution of a polymer and an inorganic laminar compound is applied as a barrier layer on at least one side of a carrier layer consisting of paper, said at least one side of the carrier layer having a smoothness of up to about 150 Bendtsen, and said liquid barrier composition is dried during heating for driving off the dispersant or solvent, whereafter the carrier layer with the applied dried barrier layer is combined and permanently united with one side of the core layer.

3. A method as claimed in claim 2, wherein said inorganic laminar compound is dispersed to an exfoliated and delaminated state in the liquid barter composition and in the dried barrier layer.

4. A method as claimed in claim 2, wherein said barrier layer is applied by means of liquid film coating with said liquid barrier composition including said inorganic laminar compound.

5. A method as claimed in claim 2, wherein the barrier layer includes from about 1 to about 30 weight % of the inorganic laminar compound, based on dry coating weight.

6. A method as claimed in claim 2, wherein the barrier layer includes from about 70 to about 99 weight % of polymer, based on dry coating weight.

7. A method as claimed in claim 2, wherein the amount of the liquid barrier composition coated onto the carrier layer is from about 1 to about 10 g/m² based on dry coating weight.

8. A method as claimed in claim 2, wherein the liquid barrier composition applied as said barrier layer includes said polymer, and said polymer having functional hydroxyl groups.

9. A method as claimed in claim 8, wherein said polymer with functional hydroxyl groups is polyvinyl alcohol, ethylene vinyl alcohol, starch, starch derivatives, carboxyl methyl cellulose and other cellulose derivatives, or a mixture of two or more thereof.

10. A method as claimed in claim 2, wherein said liquid gas barrier composition applied as said barrier layer is dried and optionally cured at a temperature of approx. 80-230° C.

11. A method as claimed in claim 2, wherein said liquid gas barrier composition applied as said barrier layer also includes a polymer with functional carboxylic acid groups.

12. A method as claimed in claim 11, wherein said polymer with functional carboxylic acid groups is ethylene acrylic acid copolymer, ethylene methacrylic acid copolymer or a mixture thereof.

13. A method as claimed in claim 12 wherein said barrier layer consists essentially of a mixture of polyvinyl alcohol, ethylene acrylic acid copolymer and the inorganic laminar compound.

14. A method as claimed in claim 3, wherein the barrier layer consists essentially of a mixture of starch or starch derivative and the inorganic laminar compound.

15. A method as claimed in claim 2, wherein the dried barrier layer is cured at a temperature of a surface of the carrier layer of up to 190° C.

16. A method as claimed in claim 2, wherein the liquid barrier composition applied as a barrier layer is dried at a web surface temperature of 140 to 160° C. and is cured at a web surface temperature of from 170 to 190° C.

17. A method as claimed in claim 2, wherein said carrier layer consists of paper with a grammage of approx. 5–35 g/m².

18. A method as claimed in claim 2, wherein said carrier layer consists of plastic coated paper.

19. A method as claimed in claim 2, wherein the carrier layer bearing at least one barrier layer is combined and united with the core layer by extrusion of a layer of thermoplastics therebetween.

20. A method as claimed in claim 2, wherein the carrier layer bears said barrier layer on one side thereof and is combined with the core layer by extrusion of a layer of thermoplastics between the earner layer and the core layer.

21. A method as claimed in claim 20, wherein an outer layer of thermoplastics is applied on the barrier layer by means of extrusion.

22. A method as claimed in claim 20, wherein the carrier layer bears said barrier layer on one or both sides and is combined with the core layer by extrusion of a layer of thermoplastics between the core layer and a said barrier layer.

23. A method as claimed in claim 22, wherein the carrier layer bears said barrier layer on both sides thereof and a layer of thermoplastics is applied to the outer layer of barrier material by extrusion.

24. A method as claimed in claim 19, wherein the layer of thermoplastics applied between the core layer and the carrier layer or said barrier layer includes a substance functioning as a light barrier.

25. A method as claimed in claim 2, wherein said at least one side of the carrier layer has a smoothness of up to about 100 Bendtsen.

* * * * *